United States Patent
Bremner et al.

(10) Patent No.: US 10,228,957 B2
(45) Date of Patent: Mar. 12, 2019

(54) ONLINE METHOD HANDLE DEDUPLICATION

(71) Applicant: International Business Machines Corporation, Armonk, NY (US)

(72) Inventors: David D. Bremner, Fredericton (CA); Daniel J. Heidinga, Ottawa (CA); Shijie Xu, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/410,926

(22) Filed: Jan. 20, 2017

(65) Prior Publication Data
US 2018/0210743 A1   Jul. 26, 2018

(51) Int. Cl.
*G06F 9/44* (2018.01)
*G06F 13/00* (2006.01)
(Continued)

(52) U.S. Cl.
CPC ............ *G06F 9/4552* (2013.01); *G06F 8/315* (2013.01); *G06F 8/433* (2013.01); *G06F 9/4488* (2018.02);
(Continued)

(58) Field of Classification Search
CPC ... G06F 12/14; G06F 9/44; G06F 9/45; G06F 11/004; G06F 9/45504; G06F 9/45516;
(Continued)

(56) References Cited

U.S. PATENT DOCUMENTS

| | | | | |
|---|---|---|---|---|
| 8,074,101 B1 * | 12/2011 | Vohra | ............... | G06F 11/004 714/4.1 |
| 8,250,325 B2 * | 8/2012 | Holdman | .......... | G06F 17/30159 711/162 |

(Continued)

FOREIGN PATENT DOCUMENTS

WO   2014105906 A1   7/2014

OTHER PUBLICATIONS

Shijie Xu et al., Mining Method Handle Graphs for Efficient Dynamic JVM Languages, Sep. 8-11, 2015 [Retrieved on Mar. 14, 2018]. Retrieved from the internet: <URL: http://delivery.acm.org/10.1145/2810000/2807440/p159-xu.pdf?> 11 Pages (159-169) (Year: 2015).*

(Continued)

*Primary Examiner* — Anibal Rivera
(74) *Attorney, Agent, or Firm* — Nicholas D. Bowman; Hunter E. Webb; Keohane & D'Alessandro PLLC

(57) ABSTRACT

Approaches presented herein enable providing online method handle deduplication by determining whether a method handle to be created is equivalent to an existing method handle in an equivalence pool. Specifically, in response to a request to create a method handle, a set of parameters including a method handle map, a class, and one or more arguments of the method handle to be created are accepted. A method handle of the class is obtained. One or more existing unique method handles found in an equivalence pool are compared to the method handle to be created to determine whether an equivalence exists. When an equivalence is found between an existing unique method handle and the method handle to be created, the existing unique method handle is returned.

20 Claims, 7 Drawing Sheets

(51) Int. Cl.
*G06F 9/455* (2018.01)
*G06F 8/41* (2018.01)
*G06F 8/30* (2018.01)
*G06F 9/448* (2018.01)

(52) U.S. Cl.
CPC ...... *G06F 9/45504* (2013.01); *G06F 9/45516* (2013.01)

(58) Field of Classification Search
CPC ... G06F 9/4488; G06F 8/315; G06F 17/30159
See application file for complete search history.

(56) References Cited

U.S. PATENT DOCUMENTS

| | | | |
|---|---|---|---|
| 8,555,264 B2* | 10/2013 | Ohrstrom | G06F 9/45504 717/116 |
| 9,569,206 B1* | 2/2017 | Dawson | G06F 8/315 |
| 9,690,709 B2* | 6/2017 | Sandoz | G06F 3/0622 |
| 9,760,350 B2 | 9/2017 | Lagergren | G06F 9/45516 |
| 9,891,900 B2* | 2/2018 | Goetz | G06F 9/4488 |
| 2011/0055471 A1 | 3/2011 | Thatcher et al. | |
| 2013/0243175 A1 | 9/2013 | Chapman et al. | |
| 2014/0189070 A1 | 7/2014 | Gero | |
| 2014/0279927 A1 | 9/2014 | Constantinescu et al. | |
| 2014/0324792 A1 | 10/2014 | Chaudhry et al. | |

OTHER PUBLICATIONS

Christina Thalinger et al., Optimizing Invokedynamic, ACM 978-1-4503-0269-2, Sep. 15-17, 2010, [Retrieved on Jul. 24, 2018]. Retrieved from the internet: <URL: https://dl.acm.org/citation.cfm?id=1852763> 9 Pages (1-9) (Year: 2010).*
John R. Rose, Bytecodes meet Combinators: invokedynamic on the JVM, 2009 ACM, [Retrieved on Oct. 4, 2018]. Retrieved from the internet: <URL: http://cr.openjdk.java.net/~jrose/pres/200910-VMIL.pdf> 11 Pages (1-11) (Year: 2009).*
Xu et al., Grace Period Disclosure, "MHDeS: Deduplicating Method Handle Graphs for Efficient Dynamic JVM Language Implementations", Jul. 18, 2016, 10 pgs.
Bremner et al., "Mining Method Handle Graphs for Efficient Dynamic JVM Languages", PPPJ '15, Sep. 8-11, 2015, Melbourne, FL, USA, 11 pgs.
Xia et al., "SiLo: A Similarity-Locality based Near-Exact Deduplication Scheme with Low RAM Overhead and High Throughput", USENIX ATC'11, Proceedings of the 2011 USENIX conference, 14 pgs.
Thalinger et al., "Optimizing Invokedynamic", PPPJ' 10, Sep. 15-17, 2010, 9 pgs.
Xu et al., "Method handle graph optimization in JVM", May 24, 2014, 1 pg.
Roussel et al., "Android 292: implementing invokedynamic in Android", JTRES' 14, Oct. 13-14, 2014, 11 pgs.
Rose, John R., "Bytecodes meet Combinators: invokedynamic on the JVM", VMIL' 09, Oct. 25, 2009, 11 pgs.
Ponge et al., "Golo, a Dynamic, Light and Efficient Language for Post-Invokedynamic JVM", PPPJ' 13, Sep. 11-13, 2013, 6 pgs.
Unknown, "Project Nashom", Hotspot Group, May 2, 2013, 2 pgs.
Zhu et al., "Avoiding the Disk Bottleneck in the Data Domain Deduplication File System", FAST '08: 6th USENIX—Conference on File and Storage USENIX Association Technologies, 2008, 14 pgs.
Lindholm et al., "The Java Virtual Machine Specification" Java SE 8 Edition, Oracle America, Inc., Feb. 13, 2015, 604 pgs.
Lillibridge et al., "Sparse Indexing: Large Scale, Inline Deduplication Using Sampling and Locality", USENIX Association 7th USENIX Conference on File and Storage Technologies, 2009, 13 pgs.
Lillibridge et al., "Improving Restore Speed for Backup Systems that Use Inline Chunk-Based Deduplication", USENIX Association 11th USENIX Conference on File and Storage Technologies (FAST '13), 2013, 15 pgs.
"JSRs: Java Specification Requests", The Java Community Process (SM) Program, Feb. 28, 2006, 5 pgs.
"JRuby: The Ruby Programming Language on the JVM", JRuby.org, 2016, 2 pgs.
Henzinger et al., "Computing Simulations on Finite and Infinite Graphs", IEEE, 1995, 10 pgs.
Heidinga, Dan, "MethodHandles", IBM Ottawa Software Lab, Jul. 27, 2010, 16 pgs.
Fan et al., "Graph Pattern Matching: From Intractable to Polynomial Time", Proceedings of the VLDB Endowment, vol. 3, No. 1, 2010, 12 pgs.
Ort, Ed, "New JDK 7 Feature: Support for Dynamically Typed Languages in the Java Virtual Machine", Jul. 2009, 6 pgs.
Bodden, Eric, "InvokeDynamic support in Soot", Proc. International Workshop on State of the Art in Java Program analysis (SOAP '12) 2012, 5 pgs.

* cited by examiner

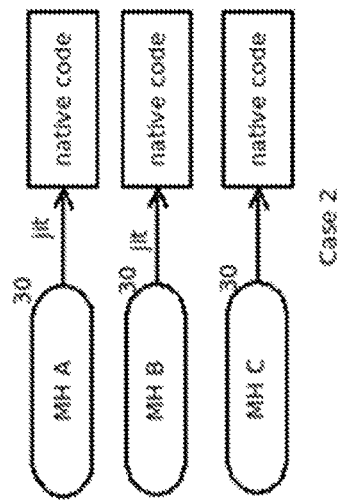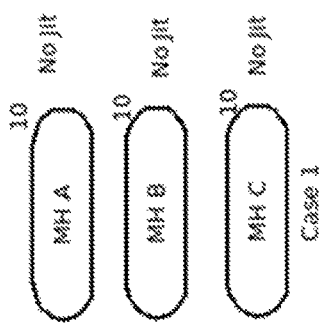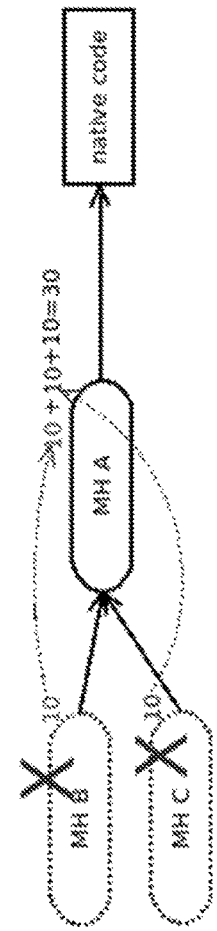
FIG. 1A
FIG. 1B

ONLINE METHOD HANDLE DEDUPLICATION

STATEMENT REGARDING PRIOR DISCLOSURES BY THE INVENTOR OR A JOINT INVENTOR

The following disclosure is submitted under 35 U.S.C. 102(b)(1)(A): DISCLOSURE: Document title: "MHDeS: Deduplicating Method Handle Graphs for Efficient Dynamic JVM Language Implementations", authors/contributors: Shijie Xu, David Bremner, and Daniel Heidinga, date made publicly available: Feb. 6, 2016, pages 1-10.

TECHNICAL FIELD

This invention relates generally to method handle deduplication and, more specifically, to an online method handle deduplication system on a Java Virtual Machine (JVM) to increase Just-In-Time (JIT) performance when dealing with method handles.

BACKGROUND

In the networked computing environment of today, processes that can run in number of different environments are becoming increasingly more sought after. One solution for facilitating these types of processes is the Java Virtual Machine (JVM) used in the JAVA environment (Java and Java Virtual Machine are a trademark of Sun Microsystems in the United States and/or elsewhere). A JVM is a platform dependent engine that executes platform independent code written in a high-level programming language. Thus, the same code (which can be written in any of a number of different programming languages) can be executed on many different platforms by utilizing a JVM that is designed for each platform.

One group of programming languages that can be used in the JAVA environment is that of dynamically typed languages. Dynamically typed languages can be made to run faster on a Java Virtual Machine (JVM) than in the past due to additional support that has been provided. A key part of this support is the addition of a Java bytecode (invokedynamic) for method invocation, and an accompanying linkage mechanism that involves a construct called a method handle. These features can enable implementers of compilers for dynamically typed languages, that is, the people who develop compilers for languages such as JRuby and Jython, to generate bytecode that runs extremely fast on a JVM.

A method handle is a simple object of type java.lang.invoke.MethodHandle that contains an anonymous reference to a JVM method. A method handle can be callable just like a named reference to a method. What makes it unique, however, is that it is accessed through a pointer structure, as opposed to a linked name.

SUMMARY

In general, embodiments of the present invention enable providing online method handle deduplication by determining whether a method handle to be created is equivalent to an existing method handle in an equivalence pool. Specifically, in response to a request to create a method handle, a set of parameters including a method handle map, a class, and one or more arguments of the method handle to be created are accepted. A method handle of the class is obtained. One or more existing unique method handles found in an equivalence pool are compared to the method handle to be created to determine whether an equivalence exists. When an equivalence is found between an existing unique method handle and the method handle to be created, the existing unique method handle is returned.

One aspect of the present invention includes a computer-implemented method for providing online method handle deduplication to: accept, in response to a request to create a method handle, a set of parameters including a method handle map, a class, and one or more arguments of the method handle to be created; obtain a method handle of the class; compare a set of existing unique method handles found in an equivalence pool to the method handle to be created; select, in response to an equivalence between an existing unique method handle and the method handle to be created, the existing unique method handle from the equivalence pool; and return the existing unique method handle.

Another aspect of the present invention includes a computer program product for providing online method handle deduplication, and program instructions stored on the computer readable storage device, to: accept, in response to a request to create a method handle, a set of parameters including a method handle map, a class, and one or more arguments of the method handle to be created; obtain a method handle of the class; compare a set of existing unique method handles found in an equivalence pool to the method handle to be created; select, in response to an equivalence between an existing unique method handle and the method handle to be created, the existing unique method handle from the equivalence pool; and return the existing unique method handle.

Yet another aspect of the present invention includes a computer system for providing online method handle deduplication, the computer system comprising: a memory medium comprising program instructions; a bus coupled to the memory medium; and a processor for executing the program instructions, the instructions causing the system to: accept, in response to a request to create a method handle, a set of parameters including a method handle map, a class, and one or more arguments of the method handle to be created; obtain a method handle of the class; compare a set of existing unique method handles found in an equivalence pool to the method handle to be created; select, in response to an equivalence between an existing unique method handle and the method handle to be created, the existing unique method handle from the equivalence pool; and return the existing unique method handle.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 1A-B show example method handle diagrams 100, 150 with and without method handle deduplication

Figure 2:
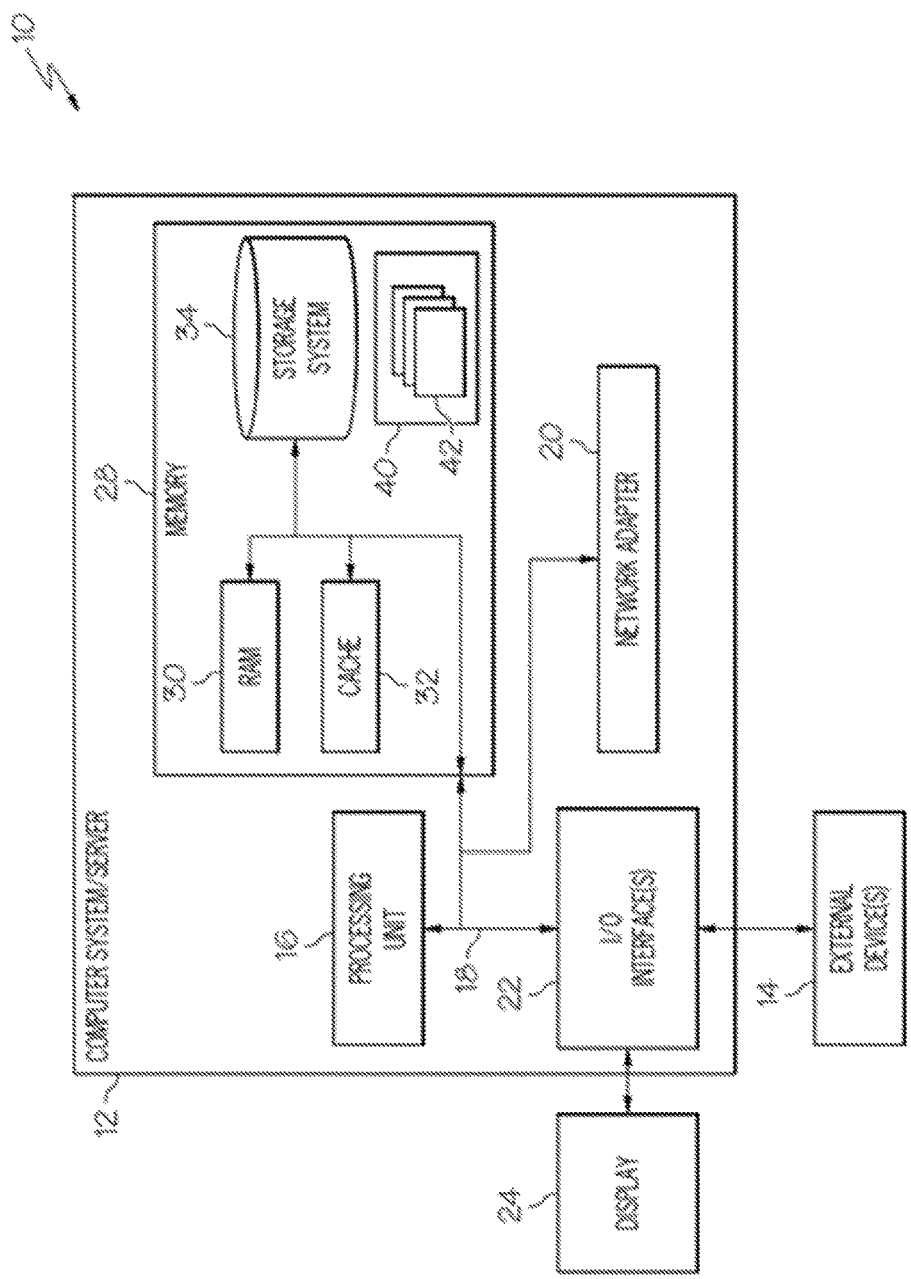
FIG. 2 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention enable providing online method handle deduplication by determining whether a method handle to be created is equivalent to an existing method handle in an equivalence pool. Specifically, in response to a request to create a method handle, a set of parameters including a method handle map, a class, and one or more arguments of the method handle to be created are accepted. A method handle of the class is obtained. One or more existing unique method handles found in an equivalence pool are compared to the method handle to be created to determine whether an equivalence exists. When an equivalence is found between an existing unique method handle and the method handle to be created, the existing unique method handle is returned.

A method handle is a typed, directly executable reference to an underlying method, constructor, field, or similar low-level operation, with optional transformations of arguments or return values. These transformations are quite general, and include such patterns as conversion, insertion, deletion, and substitution. Each method handle is provided by developers and references an external method. Further, a method referenced by a method handle can have references to other method handles included therein. To this extent, multiple method handles can form a method handle graph (MHG), which contains a directed representation of the method handles in a particular portion of code. The method handles in a particular portion of code are recognized to be equivalent if the MHG started by each method handle is equivalent.

The inventors of the invention described herein have discovered certain deficiencies in the current solutions for processing method handles in a JVM environment. For example, the existence of equivalent method handles in current solutions not only increases memory volume for program runtime, but also decreases runtime performance when a Just-In-Time (JIT) compiler is in use. Generally, the JIT compiler translates a Java method to native machine code when the invocation counters of the method exceeds a predefined threshold. Equivalent method handles deteriorate this process in several ways. For example, the equivalence defers the time of JIT compilation, expanding the usage of time and resources. Further, it results in multiple equivalent JIT compilations and equivalent generated native codes, which are completely unnecessary).

For example, FIG. 1A shows example method handle diagram 100 with method handle deduplication. As shown in FIG. 1A, the three equivalent method handles, A, B, and C, would not be translated to native code as their individual invocation counts are less than the compilation threshold even though even though their cumulative invocation count exceeds the native compilation threshold. Without treating the equivalent method handles as a single entity, native compilation will be delayed. Furthermore, once the invocation counts of methods A, B, and C exceed the threshold, the JIT compiler will be doing redundant work by compiling each of the equivalent methods into native code. FIG. 1B shows example method handle diagram 150 with the duplicate method handles that would be created using present solutions after equivalence detection has deduplicated them and combined their invocation counts.

The inventors of the invention described in this disclosure have recognized certain deficiencies in known methods for managing method handles. Even though there has been much work on the implementation of the invokedynamic instruction as well as on the design of method handles, most of the work only focuses on instruction optimization and method handle class design, without addressing duplication. Thus, the generation of equivalent method handles in the code created by developers is ignored at the JVM level. The approaches described herein provide an online method handle deduplication system on the JVM to increase JIT performance when dealing with method handles (i.e., a reduction of both memory volume and the number of JIT compilations on method handles).

Referring now to FIG. 2, a computerized implementation 10 of an embodiment for providing online method handle deduplication by determining whether a method handle to be created is equivalent to an existing method handle in an equivalence pool will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable customer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for providing online method handle deduplication by determining whether a method handle to be created is equivalent to an existing method handle in an equivalence pool. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for providing online method handle deduplication by determining whether a method handle to be created is equivalent to an existing method handle in an equivalence pool, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a customer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 3:
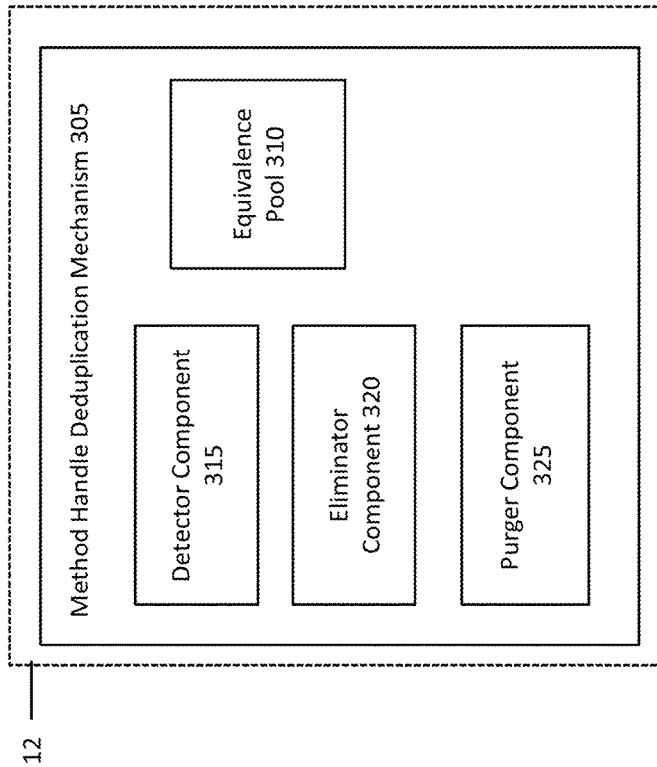
FIG. 3 shows a block diagram 300 illustrating a method handle deduplication mechanism 305 according to illustrative embodiments.

Referring now to FIG. 3, a block diagram 300 describing the functionality discussed herein according to an embodiment of the present invention is shown. It is understood that the teachings recited herein may be practiced within any type of computing environment (e.g., computer system 12). To this extent, the teachings recited herein may be practiced within a stand-alone computer system or within a networked computing environment (e.g., a client-server environment, peer-to-peer environment, distributed computing environment, cloud computing environment, and/or the like). If the teachings recited herein are practiced within a networked computing environment, each physical server need not have a method handle deduplication mechanism 305 (hereinafter "system 305"). Rather, system 305 could be loaded on a server or server-capable device that communicates (e.g., wirelessly) with the physical server to provide content approval therefor. Regardless, as depicted, system 305 can be implemented as program/utility 40 on computer system 12 of FIG. 2 and can enable the functions recited herein. It is further understood that system 305 can be incorporated within or work in conjunction with any type of system that receives, processes, and/or executes commands with respect to IT resources in a networked computing environment. Such other system(s) have not been shown in FIG. 3 for brevity purposes.

As shown, system 305 includes four main components: equivalence pool 310, detector component 315, eliminator component 320, and purger component 325. In the system, the equivalence pool manages all recognized unique method handles. Based on the equivalence pool, detector component 315 determines whether a new method handle to be created will be unique or not, while eliminator component 320 performs post detection tasks. The components and the functions of each will be described in greater detail below.

Figure 4:
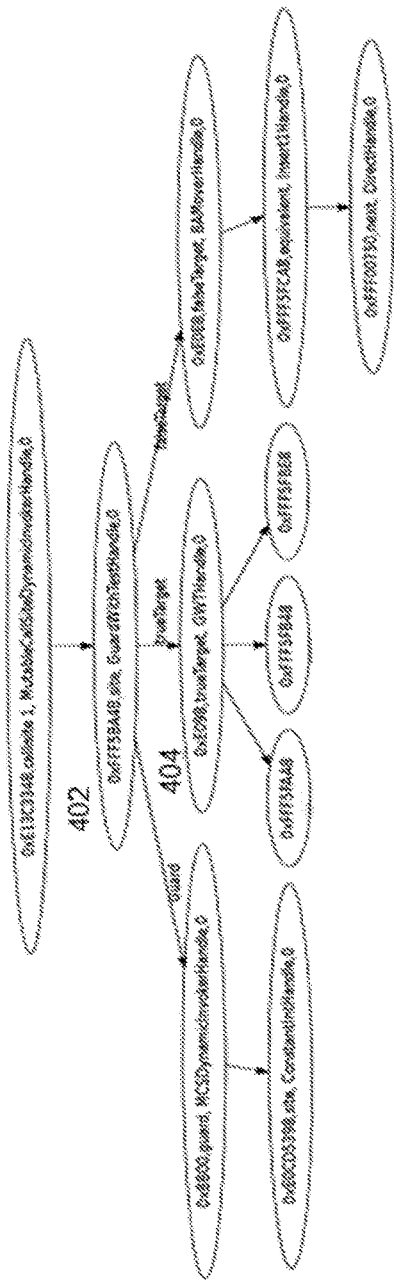
FIG. 4 shows method handle example 400 in which method handle deduplication mechanism 305 may operate according to illustrative embodiments.

FIG. 4 shows an example method handle 400 with reference to three different method handles. A method handle references a Java method, a constructor, or a field. In the sample code below, method handle gwtMH references the method 'gwt', of the class 'My', and it transforms the method invocation on method 'gwt' to another three method handle invocations.

```
static MethodHandle gwtMH = lookup( ).findVirtual(My.class,
"gwt",methodType(String.class, String.class));
public class My{
    MethodHandle guard = lookup( ).findVirtual(String.class, "");
    MethodHandle target = lookup( ).findVirtual(..);
    MethodHandle fallback = lookup( ).findVirtual(..);
    public String gwt(String args) {
        if((boolean) guard.invokeExact(..)){
            return target.invokeExact(...);
        }else{
            return fallback.invokeExact(...);
        }
    }
}
```

A Method Handle Graph (MHG) consists of multiple method handle nodes and directed edges between nodes. In the MHG, a directed edge represents that the method referenced by the source method handle contains the reference of the target method handle, and this edge is associated with a string value that is the reference name of the target method handle in the method. A method handle node represents a method handle object during program runtime, and it comprises its identifier (id), type, invocation count, etc. As shown in FIG. 4, method handle 402 of GuardWithTesthandle references three different method handles: guard, trueTarget 404, and falsetarget.

Figure 5:
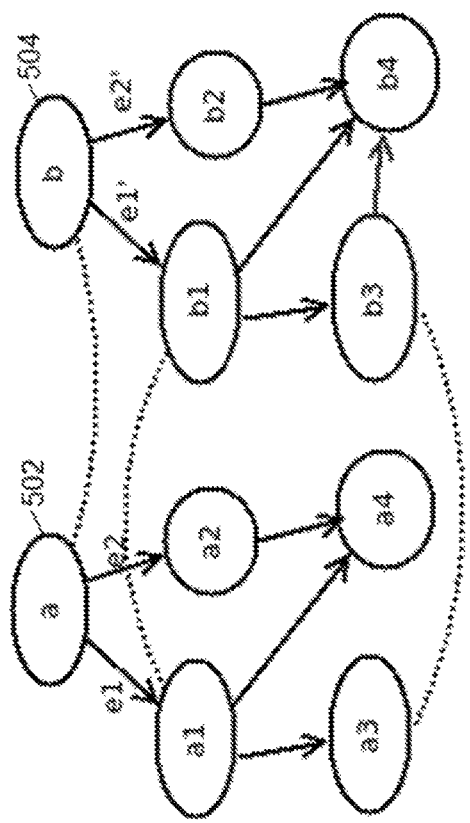
FIG. 5 shows example method handle graph 500 in which method handle deduplication mechanism 305 may operate according to illustrative embodiments.

Two method handles are recognized to be equivalent if two MHGs started by both method handles are equivalent. The MHG equivalence is abstracted as a graph equivalence, which is shown in FIG. 5. Two graphs, G(V,E) and G(V', E'), are recognized to be equivalent if there exist two mapping functions: f: V→V' and g: E→E', so that for any u in V, v in V, and (u,v) in E, the conditions f(u) in V', f(v) in V', and g({f(u),f(v)}) are also in E'. According to this definition, two method handle graphs, a 502 and b 504 in FIG. 5, are not equivalent because none of the edges in MHG a 502 are mapped by the edge (b3, b4) in the MHG a 502.

Figure 6:
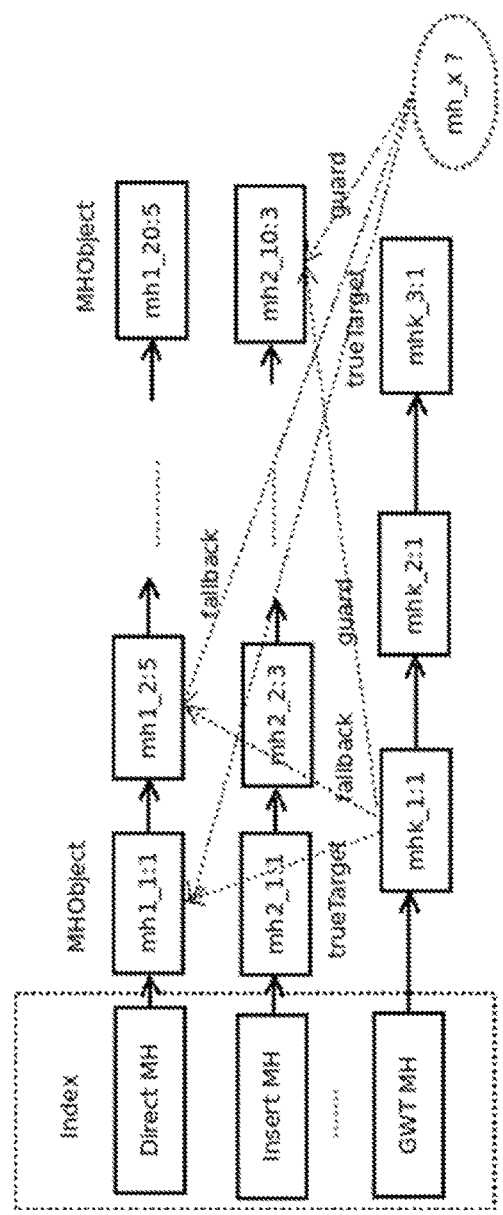
FIG. 6 shows an example organization 600 of detected unique method handles according to illustrative embodiments.

Equivalence pool 310 is a pool that organizes all detected unique method handles in a pair (transformation name, unique method handle list), as shown in FIG. 6. Each unique method handle in the list is also associated with an AtomicInteger value, indicating the number of times the method handle is hit during equivalence detection. Referring back to FIG. 6, for example, 'Direct MH' indexes twenty unique direct method handles, the last of which has been hit by five times, while all unique GWT method handles are only be hit by one.

Detector component 315 determines whether a method handle to be created is equivalent to an existing unique method handle on equivalence pool 310. It accepts three types of parameters: class, (newCIs), a method handle map (MHs), and additional arguments (args) of the method handle to be created. It returns an empty reference if none of the existing unique method handles found in equivalence pool 310 are determined to be equivalent to the method handle to be created. The work flow diagram is shown in FIG. 7 and the main procedure is discussed below.

The new method handle to be created may include three parameters. The first parameter is a class (newCIs) which identifies the type of the method handle to be created. The second parameter is a method handle map (MHs). The map is in a pair format (i.e., string and method handle) defining what method handle is to be assigned to the field members of the method handle to be created. The third parameter includes other necessary arguments (args) for creation of the new method handle.

Figure 7:
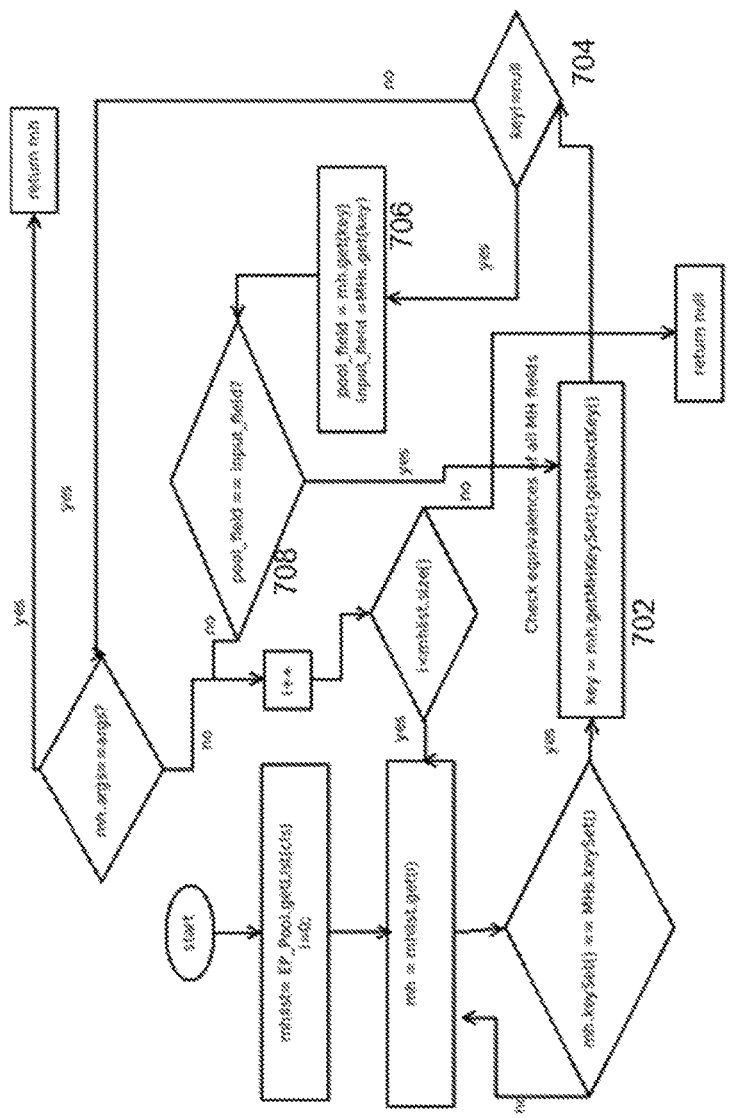
FIG. 7 shows a process flowchart 700 for providing online method handle deduplication by determining whether a method handle to be created is equivalent to an existing method handle in an equivalence pool according to illustrative embodiments.

Referring now to FIG. 7, in conjunction with FIG. 3, an implementation of a process flowchart 700 for providing online method handle deduplication by determining whether a method handle to be created is equivalent to an existing method handle in an equivalence pool is shown. To begin the process, detector component 315 obtains a unique method handle of the new class (newCIs). Next, detector component 315 selects a method handle from a method handle list when two conditions are met. If the two conditions are met, the selected method handle is used rather than creating a new method handle. The first condition is satisfied when the field members of the method handle to be created are equal to the corresponding field members of a method handle from the list. This is shown in steps 702 to 708 of FIG. 7, during which all MH field members of the method handle to be created are compared to the corresponding ones in given parameter MHs. If the first condition is met, then the second condition is met when the primitive data fields in the method handle from the list satisfying the first condition is equivalent to given arguments (args) of the method handle to be created. If an equivalent method handle is found, the selected method handle is returned and may be used rather than creating a new method handle. Otherwise, a null value is returned and a new method handle may be created.

Referring now to an example shown in FIG. 6, assume a new method handle, mh_x, is requested to be created with arguments {newCIs: GWT, MHs:{guard:mh_2_10, trueTarget:mh1_1, fallback:mh1_2}, args:{ }}. Detector component 315 iterates the list of 'GWT MH', and returns mhk_1, as its child method handle references point to the same method handle objects which are also referenced by corresponding entries in the MHs.

Eliminator component 320 performs some necessary procedures according to the result from detector component 315. One procedure is to increment the invocation count on the returned method handle when it is non-empty. Otherwise, it calls the constructor method of the method handle to be created with given arguments, and adds it to equivalence pool 310.

To avoid equivalence pool 310 occupying excessive amounts of memory, purger component 325 may be configured to remove some obsolete content from a pool period at predefined intervals and/or as requested or needed. There are two kinds of purge functions according to the removal target: method handle purge and entry purge. For the former, a method handle is removed from a list in equivalence pool 310 if this method handle reference has already been garbage collected or its invocation counter value is less than a predefined threshold. JVM's built-in garbage collection allows developers to create new objects without worrying explicitly about memory allocation and deallocation, because the garbage collector automatically reclaims memory for reuse. This enables faster development with less boilerplate code, while eliminating memory leaks and other memory-related problems, at least in theory. For the latter (i.e., entry purge), the whole pair (transformation name, unique method handle list) is removed from equivalence pool 310 when a predefined percentage (e.g., a majority) of the method handles in the list of the entry are determined to be rarely hit (e.g., number of times found to be equivalent to a method handle to be created falls below a predefined threshold based on the number of potential times the method handles in the list could have been found equivalent).

The purge is performed in an independent thread which is automatically scheduled periodically. In the thread, the entry purge occurs less frequently than the method handle purge. For example, an entry purge follows every ten method handle purges, during which some method handles are removed from the list.

In order to reduce the purge impacts on the deduplication, there are two level locks: entry lock and equivalence pool (EP) lock. An entry lock is applied to an entry pair (i.e., transformation name, unique method handle list) in equivalence pool 310. All entry operations, both list iteration during unique method handle detection and method handle purge, will acquire the read-lock of the entry lock. The write-lock is only used before removing an obsolete method handle node from the entry list. In contrast to the entry lock, the write-lock of the EP lock is acquired when purging an entry from equivalence pool 310. Notice there is no individual method handle lock as the invocation counter of a method handle has already been an Atomic Integer.

Process flowchart 700 of FIG. 7 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for providing online method handle deduplication by determining whether a method handle to be created is equivalent to an existing method handle in an equivalence pool. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for providing online method handle deduplication by determining whether a method handle to be created is equivalent to an existing method handle in an equivalence pool. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for providing online method handle deduplication by determining whether a method handle to be created is equivalent to an existing method handle in an equivalence pool. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for providing online method handle deduplication in a JAVA method to:
    accept, in response to a request to create a method handle, a set of parameters including a method handle map, a class, and one or more arguments of the method handle to be created;
    obtain a method handle of the class;
    compare a set of existing unique method handles found in an equivalence pool to the method handle to be created;
    select, in response to an equivalence between an existing unique method handle and the method handle to be created, the existing unique method handle from the equivalence pool such that a single compilation of the existing unique method handle is used for every equivalent method handle in the JAVA method; and
    return the existing unique method handle.

2. The computer-implemented method of claim 1, wherein an equivalence is determined when one or more field members of the existing unique method handle are equal to one or more field members of the method handle to be created and one or more primitive data fields of the existing unique method handle are equal to the one or more arguments of the method handle to be created.

3. The computer-implemented method of claim 1, further comprising returning a null value when an equivalence is not determined between any existing unique method handles found in the equivalence pool and the method handle to be created.

4. The computer-implemented method of claim 1, wherein the equivalence pool comprises a pool that organizes a set of existing unique method handles in a whole pair format consisting of a transformation name and a unique method handle list.

5. The computer-implemented method of claim 4, wherein each existing unique method handle in the unique method handle list is associated with an invocation value indicating a number of times the existing unique method handle has been determined to be equivalent to a method handle to be created.

6. The computer-implemented method of claim 5, further comprising removing a method handle from the unique method handle list when the method handle reference has been garbage collected or the invocation value is less than a predetermined threshold.

7. The computer-implemented method of claim 3, further comprising creating a new method handle and adding the new method handle created to the equivalence pool when a null value is returned.

8. A computer program product for providing online method handle deduplication in a JAVA method, and program instructions stored on the computer readable storage device, to:
    accept, in response to a request to create a method handle, a set of parameters including a method handle map, a class, and one or more arguments of the method handle to be created;
    obtain a method handle of the class;
    compare a set of existing unique method handles found in an equivalence pool to the method handle to be created;
    select, in response to an equivalence between an existing unique method handle and the method handle to be created, the existing unique method handle from the equivalence pool such that a single compilation of the existing unique method handle is used for every equivalent method handle in the JAVA method; and
    return the existing unique method handle.

9. The computer program product of claim 8, wherein an equivalence is determined when one or more field members of the existing unique method handle are equal to one or more field members of the method handle to be created and one or more primitive data fields of the existing unique method handle are equal to the one or more arguments of the method handle to be created.

10. The computer program product of claim 8, further comprising program instructions to return a null value when an equivalence is not determined between any existing unique method handles found in the equivalence pool and the method handle to be created.

11. The computer program product of claim 8, wherein the equivalence pool comprises a pool that organizes a set of existing unique method handles in a whole pair format consisting of a transformation name and a unique method handle list.

12. The computer program product of claim 11, wherein each existing unique method handle in the unique method handle list is associated with an invocation value indicating a number of times the existing unique method handle has been determined to be equivalent to a method handle to be created.

13. The computer program product of claim 12, further comprising program instructions to remove a method handle from the unique method handle list when the method handle reference has been garbage collected or the invocation value is less than a predetermined threshold.

14. The computer program product of claim 10, further comprising program instructions to create a new method handle and add the new method handle created to the equivalence pool when a null value is returned.

15. A computer system for providing online method handle deduplication in a JAVA method, the computer system comprising:
  a memory medium comprising program instructions;
  a bus coupled to the memory medium; and
  a processor for executing the program instructions, the instructions causing the system to:
    accept, in response to a request to create a method handle, a set of parameters including a method handle map, a class, and one or more arguments of the method handle to be created;
    obtain a method handle of the class;
    compare a set of existing unique method handles found in an equivalence pool to the method handle to be created;
    select, in response to an equivalence between an existing unique method handle and the method handle to be created, the existing unique method handle from the equivalence pool such that a single compilation of the existing unique method handle is used for every equivalent method handle in the JAVA method; and
    return the existing unique method handle.

16. The computer system of claim 15, wherein an equivalence is determined when one or more field members of the existing unique method handle are equal to one or more field members of the method handle to be created and one or more primitive data fields of the existing unique method handle are equal to the one or more arguments of the method handle to be created.

17. The computer system of claim 15, further comprising program instructions to return a null value when an equivalence is not determined between any existing unique method handles found in the equivalence pool and the method handle to be created.

18. The computer system of claim 15, wherein the equivalence pool comprises a pool that organizes a set of existing unique method handles in a whole pair format consisting of a transformation name and a unique method handle list.

19. The computer system of claim 18, wherein each existing unique method handle in the unique method handle list is associated with an invocation value indicating a number of times the existing unique method handle has been determined to be equivalent to a method handle to be created.

20. The computer system of claim 17, further comprising program instructions to create a new method handle and add the new method handle created to the equivalence pool when a null value is returned.

* * * * *